United States Patent [19]

Odom, Jr.

[11] Patent Number: 4,738,192

[45] Date of Patent: Apr. 19, 1988

[54] GRILL FRAME AND METHOD OF APPLICATION

[76] Inventor: William J. Odom, Jr., P.O. Box 97, Dalzell, S.C. 29040

[21] Appl. No.: 923,120

[22] Filed: Oct. 24, 1986

[51] Int. Cl.⁴ .............................................. A47J 43/18
[52] U.S. Cl. ........................................ 99/351; 99/419; 248/175
[58] Field of Search ............. 99/351, 419, 426, 421 R; 248/175, 173, 560

[56] References Cited

U.S. PATENT DOCUMENTS

| | | | |
|---|---|---|---|
| 3,026,400 | 3/1962 | Van Sciver | 99/419 |
| 4,127,060 | 11/1978 | Curtis | 99/419 |
| 4,450,759 | 5/1984 | Steibel | 99/419 |
| 4,481,874 | 11/1984 | Greck | 99/419 |

Primary Examiner—Louis K. Rimrodt
Assistant Examiner—Judith L. Olds
Attorney, Agent, or Firm—Penrose Lucas Albright Pravel, Gambrell, Hewitt, Kimball & Krieger

[57] ABSTRACT

The grill frame includes a pair of elongated shaft members which are resiliently connected at their first ends so that upon the insertion of the first end into the abdominal cavity of the fowl, the shaft members may be urged against the opposite sides of the abdominal cavity with sufficient force to enlarge the abdominal cavity laterally and to disperse the meat of the fowl to substantially the equal plane. The method of insertion is such that the shaft members are held in substantially close proximity as the first end is inserted through the cavity and the shaft members are allowed to expand outwardly as the first end of the apparatus extrudes out of the rear of the cavity with the apparatus in position within the fowl.

12 Claims, 1 Drawing Sheet

GRILL FRAME AND METHOD OF APPLICATION

BACKGROUND OF THE INVENTION

1. Field of the Invention

The present invention relates to grilling of fowl. More particularly, the present invention relates to an apparatus insertible into the abdominal cavity of a foil carcus for enlarging the abdominal cavity in order to achieve more uniform cooking of the fowl.

2. General Background

In the grilling or bar-b-quing of small fowl such as quail, cornish hends, or the like, one of the problems confronted is the fact that the fowl carcus, in order to achieve uniform cooking, must be, for the most part, cut into separate pieces, or cut into two halves, so that each half may be set on the grill for maximum exposure to the heat for achieving uniform cooking. However, due to the size of these particular types of fowl, it is often desired that the fowl be maintained as a single entity to cook as a whole.

One manner of achieving this end is to debone the fowl carcus, i.e., remove the breast plate and ribs and, attempt to spread the fowl carcus in such a manner as to uniformly cook the back and the front of the fowl in a single step while still whose. This of course is difficult, often times, in that the meat of the fowl must sometimes be mangled so that the carcus does lay flat on the grill. Therefore, there is a need in the art for an apparatus utilized with deboned fowl to assist in positioning the carcus into substantially a single plane for grilling.

SUMMARY OF THE PRESENT INVENTION

The primary purpose and object in the present invention is to ensure the uniform cooking of fowl on a grill. Essentially the apparatus is directed to a frame which includes a pair of elongated shaft members which are resiliently connected at their first ends, with the second ends forming the shape of a "V". Upon the insertion of the first end of the frame into the abdominal cavity of the fowl, the shaft members may be urged against the opposite sides of the abdominal cavity with sufficient force to enlarge the abdominal cavity laterally and to disperse the meat of the fowl to substantially a flat plane. The method of insertion is such that the shaft members are held in substantially close proximity to one another as the first end is inserted through the cavity neck portion and into the abdominal cavity rearwardly; subsequently, the shaft members are allowed to expand outwardly as the first end of the apparatus and shaft members extrude out of the rear of the cavity of the fowl with the apparatus in position within the fowl to expand the abdominal cavity of the fowl and achieve a level plane of meat to grill.

Although the primary object of the invention is to provide the cooking frame as summarized above, other objects, adaptabilities and capabilities of the invention will appear as the description progresses, reference being had to the accompanying drawings in which:

DESCRIPTION OF THE PREFERRED EMBODIMENT

Figure 1:
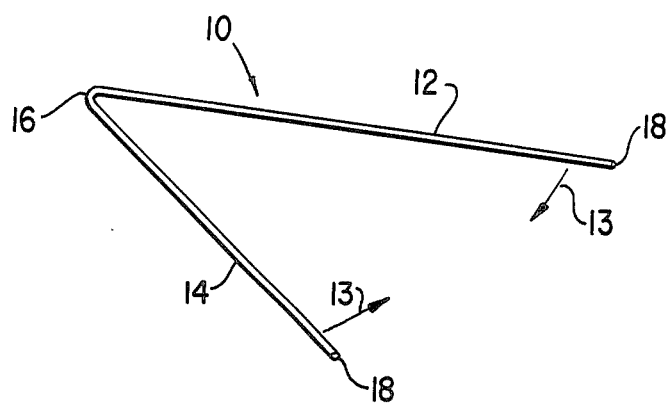
FIG. 1 is an overall view of the preferred embodiment of the grill frame of the present invention.

FIGS. 1-4 are directed to a current recently introduced commercial embodiment of the present invention.

Referring now to FIGS. 1-4, reference is made to the present invention illustrated by the numeral 10. Grill frame 10 would be a single wire element, preferably a stainless steel wire, including a first elongated shaft member 12, a second elongated shaft member 14, both shaft members 12 and 14 being of substantially equal length, and resiliently interconnected at a first end 16, so that the second free ends 18 of shaft members 12 and 14 my be flexed inwardly and outwardly during use of the frame as seen by Arrows 13. The frame, would in effect be substantially V-shaped with the resilient connection forming the nadir of the V, and shafts 12 and 14 comprising the limbs of the V.

Figure 2:
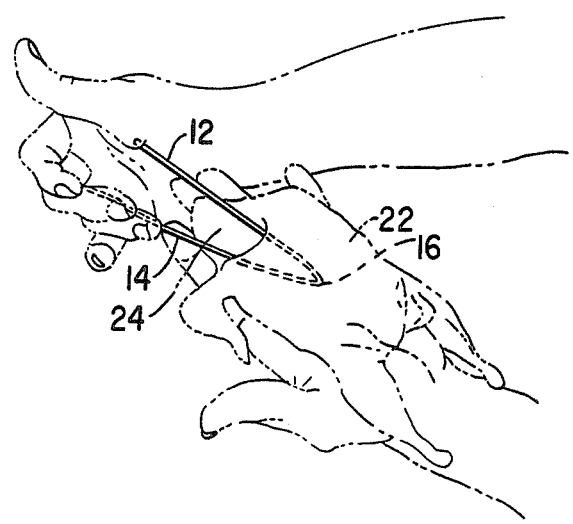
FIG. 2 is an overall view of the grill frame being inserted into the abdominal cavity of a deboned fowl.

As seen in FIG. 2, there is illustrated a deboned fowl carcus 20, which is positioned on its backside, exposing its breast portion 22. As is illustrated, the first end portion 16 of grill frame 10 would be insertible into fowl carcus 20 and puncture the skin of the fowl at the base of the neck skin 24. The free ends 18 of shafts 12 and 14 of grill frame 10 are then manually flexed inwardly as the first end 16 of grill frame 10 is forced down through the middle of the deboned fowl rearwardly until the two free ends 18 of the grill frame 10 are positioned within into the cavity of the fowl beneath the breast portion 22.

Figure 3:
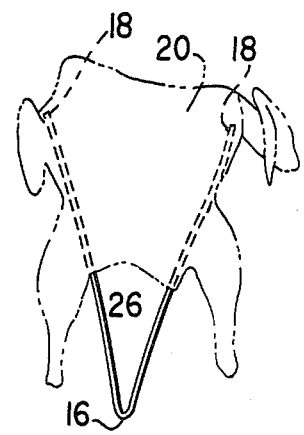
FIG. 3 is a top view of the grill frame in position within the fowl.

As is illustrated in FIG. 3, following the positioning of the grill frame 20 so that the end portions 18 are within the breast cavity, the first end portion 16 and a portion of the shaft members 12 and 14 would be extruding from the rear 26 of the fowl, and at that point, the end portions 18 of the shaft members 12 and 14 would be flexed outwardly engaging the opposite sides of the abdominal cavity of fowl carcus 20 with sufficient force to enlarge the abdominal cavity laterally and disperse the meat of the fowl equally to substantially a single plane.

Figure 4A:
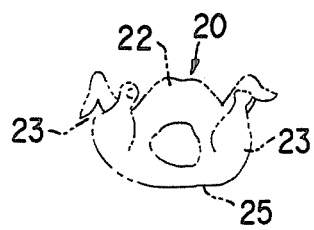
FIG. 4A is a rear view of a deboned fowl carcus prior to the insertion of the grill frame within the fowl.
Figure 4B:
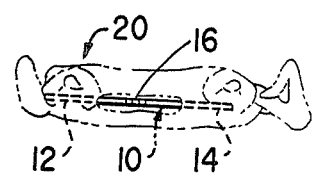
FIG. 4B is a rear view of a fowl carcus following the insertion of the grill frame therein.

FIG. 4A illustrates a rear view of the deboned fowl carcus 20 prior to the insertion of the grill frame 10 thereinto. As seen in the FIGURE, carcus 20 for the most part would resemble a typical uncooked fowl, having the upper breast portion 22 and limbs 23 as it is positioned on its back 25. FIG. 4B represents a rear view of fowl carcus 20 following the insertion of grill frame 10 thereinto, as is seen in top view in FIG. 3. As illustrated in FIG. 4B, carcus 20, has undergone expansion of the abdominal cavity due to the flexing of the shaft members 12 and 14 therewithin. Carcus 20, for the most part, is substantially expanded to a single plane, so that the carcus, upon being placed upon a grill, may be cooked uniformly.

Following this insertion, the fowl 20 is then positioned onto a grill on either its top or bottom sides and allowed to cook with greater unformity. As an inside, it should be noted that during the maneuvering of the fowl following the insertion of the frame thereinto, the first end portion 16 may be utilized as a means for carrying, positioning and turning the fowl during the cooking process in addition to its primary function of serving to disperse the abdominal cavity of the fowl for more uniform cooking.

It will be evident to those skilled in the art that the drawings, FIGS. 1–4 are in so far as drawn to scale.

Although I have disclosed the preferred embodiment of my invention in the foregoing specification and drawings, it is to be understood that the inventive concepts incorporated therein may be embodied in other adaptations and modifications within the scope of the claims.

Having described by invention, what I claim as new and to be secured by letters patent of the United States is:

1. For use in the process of grilling a fowl, a frame to be inserted in the abdominal cavity of the fowl, which comprises a pair of elongated shafts resiliently connected on one of their respective ends so that the opposite shafts are urged against the interior sides of the abdominal cavity with sufficient force to expand the abdominal cavity laterally to dispose the meat of the fowl equally.

2. The frame in accordance with claim 1, wherein the elongated shafts are integrally connected.

3. The frame in accordance with claim 2, wherein the frame is substantially V-shaped, the resilent connection forming the lower aspects of the V and the elongated shafts forming the limbs of the V.

4. The frame in accordance with claim 3, wherein the frame is composed of stainless steel.

5. The frame in accordance with claim 1, wherein the free ends of the elongated shaft may be urged inwardly and outwardly in relation to one another during application.

6. An apparatus for insertion into the abdominal cavity of a fowl to achieve more uniform grilling, the apparatus comprising:
   a. a substantially V-shaped frame means, having first and second shaft members resilently attached at a first end and flexibly movable on the second free ends so that upon insertion into the cavity of a fowl, the respective free ends of the shafts are urged against the opposite sides of the abdominal cavity with sufficient force to expand the abdominal cavity laterally and conform the meat to a substantially flat plane.

7. The apparatus in accordance with claim 6, wherein the elongated shafts are substantially of equal length and integrally attached at their first end.

8. The apparatus in claim 6, wherein the elongated shafts are flexed inwardly during insertion into the abdominal cavity of the fowl and flexed outwardly once in position within the abdominal cavity.

9. The apparatus in claim 6, wherein said frame is composed of stainless steel.

10. A method of expanding the abdominal cavity of a fowl in order to dispose the meat into a generally flat configuration for being cooked on a grill, the method comprising the following steps:
   a. providing a frame, the frame further comprising a pair of elongated shaft members flexibly connected at a first end, and forming substantially a V-shaped member;
   b. inserting the first end portion of the shaft members into the neck area of the fowl in a direction traveling rearwardly through the abdominal cavity of the fowl; and
   c. allowing the free end members to flex outwardly once in position within the abdominal cavity so that the shafts are urged against the opposite sides of the abdominal cavity with sufficient force to enlarge the abdominal cavity laterally and the meat of the fowl is disposed in a generally flat configuration.

11. The method in claim 10, wherein a substantial porition of the frame extrudes through the rear of the fowl when the free ends of the shafts are in position within the abdominal cavity.

12. The method in claim 10, further comprising the step of flexing the free ends of the shafts inwardly as the first end is being inserted through the abdominal cavity of the fowl.

* * * * *